July 9, 1940.  J. H. CHAPLIN  2,207,284
LIQUID DISPENSING INDICATOR
Filed Oct. 19, 1938  3 Sheets-Sheet 2
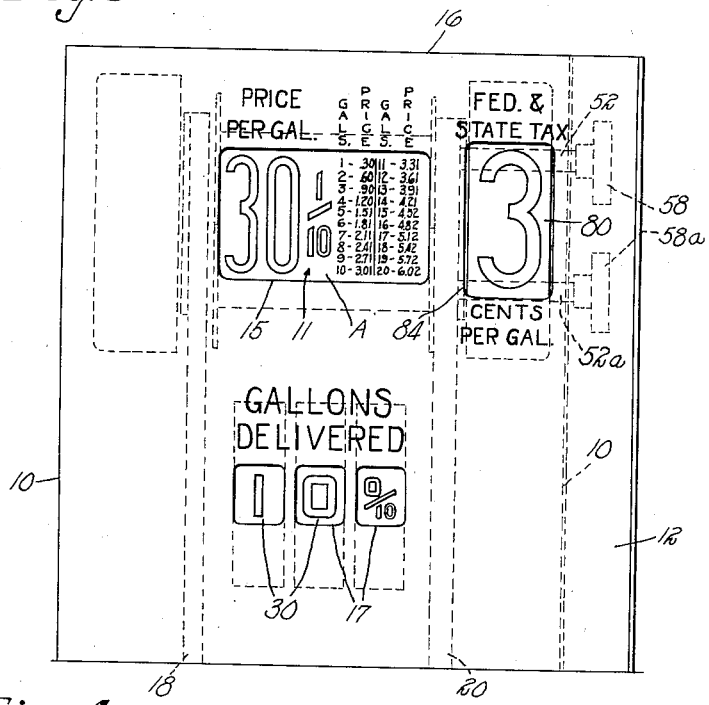
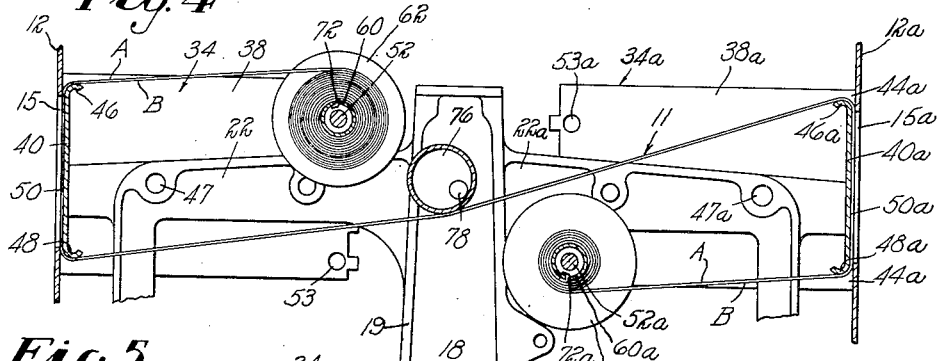
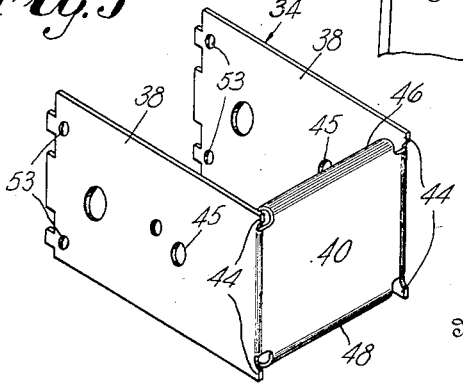
Inventor
JOHN H. CHAPLIN
By *N. Clay Lindsey*
Attorney July 9, 1940.  J. H. CHAPLIN  2,207,284
LIQUID DISPENSING INDICATOR
Filed Oct. 19, 1938  3 Sheets-Sheet 3
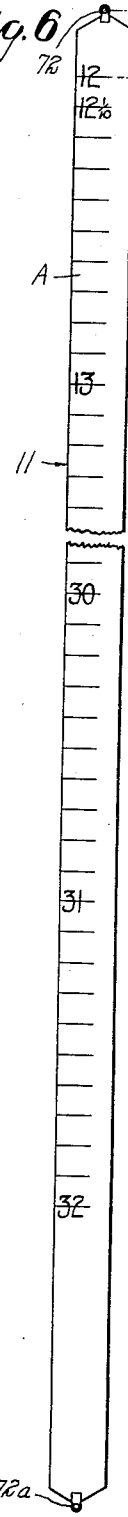
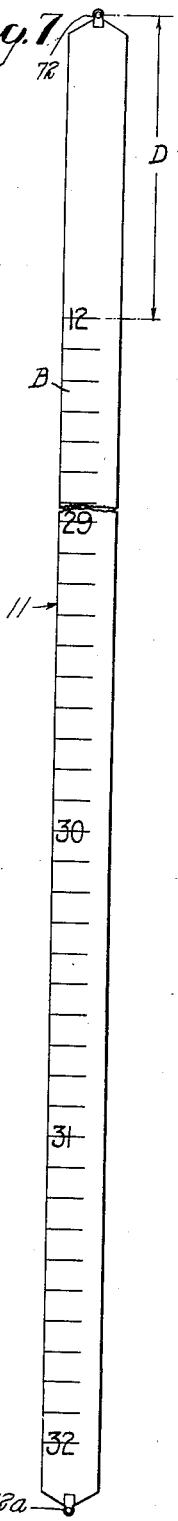
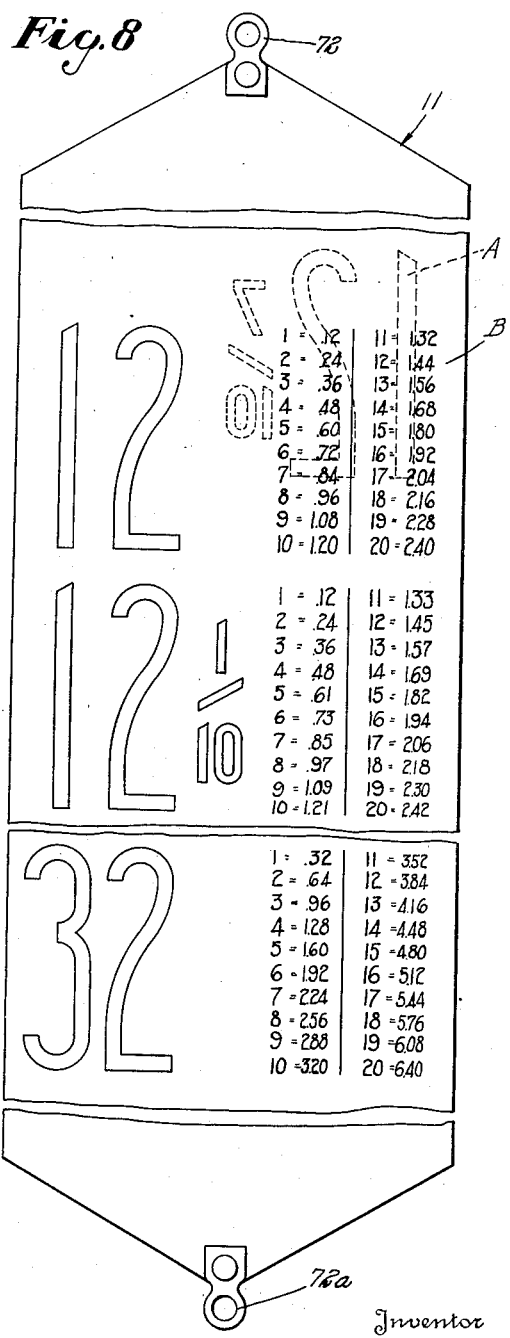
Inventor
JOHN H. CHAPLIN
By T. Clay Lindsey
Attorney Patented July 9, 1940

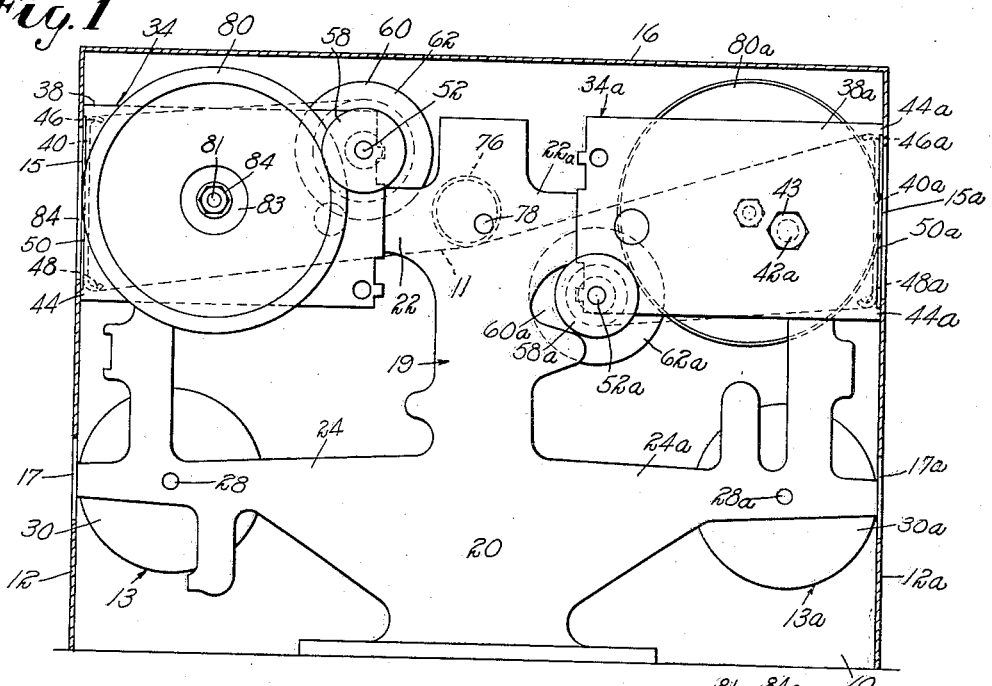

2,207,284

UNITED STATES PATENT OFFICE 2,207,284

LIQUID DISPENSING INDICATOR

John H. Chaplin, West Hartford, Conn., assignor to Veeder-Root, Incorporated, Hartford, Conn., a corporation of Connecticut Application October 19, 1938, Serial No. 235,790

1 Claim. (Cl. 40—86)

The present invention relates to price indicating means adapted for use on liquid dispensers and more particularly for the type of dispenser which indicates the number of gallons delivered but does not automatically compute the total cost thereof.

At present, many dispensers are so constructed that the total number of gallons delivered and the total price is automatically registered and indicated on suitable dials or by suitable counter wheels arranged for easy reading on the front and rear of the pump casing. On the types of dispensers which do not utilize a cost computer for indicating the total price of the liquid delivered, there is generally provided a rack in which there is displayed a price card indicating the cost per unit; it being necessary to change the card with each increase or decrease in price per unit. Moreover, the rack is secured to the casing at the side or top thereof and is not positioned relative to the counters indicating the total liquid dispensed for each transaction, and thus cannot be easily and simultaneously read therewith.

In accordance with the present invention, there is incorporated within the casing and alignable with suitable front and rear openings provided therein, an adjustable indicating tape having printed on each side thereof a graduated scale of price per unit of liquid dispensed, and associated with each price per unit is a graduated scale showing the total price for the number of units delivered; the tape being arranged to simultaneously display the same indicia in each of said front and rear openings. The openings for displaying the price per unit are positioned adjacent the openings for the counters indicating the total units delivered, whereby the customer may readily determine the amount he must pay for the product. There is also associated with the cost per unit window another window in which there may be displayed the tax per unit, and so coordinated with relation to the price per unit window and counter window that all are readily visible to the purchaser.

Other objects will be in part obvious and in part pointed out more in detail hereinafter.

The invention accordingly consists in the features of construction, combination of elements, and arrangement of parts which will be exemplified in the construction hereafter set forth and the scope of the application of which will be indicated in the appended claim.

In the accompanying drawings:

Figure 1 is a side view of one embodiment of the invention;

Fig. 2 is a plan view partly in section of Fig. 1;

Fig. 3 is a view of the front of the apparatus;

Fig. 4 is a sectional view of Fig. 1;

Fig. 5 is a perspective view of one of the tape supporting brackets;

Fig. 6 is a diagrammatic view of one side of the indicating tape and the price graduations thereon;

Fig. 7 is a view of the reverse side of the tape shown in Fig. 6; and

Fig. 8 is a partial view of the tape indicating the price per unit and the scale for each price per unit which is associated therewith.

Referring to the drawings, there is shown, generally, the upper portion of a liquid dispensing apparatus such as that now commonly used for the dispensing of gasoline. The apparatus includes an outer casing having side plates 10, front and rear end plates 12 and 12a, and a top plate 16; the end plates having upper aligned openings 15 and 15a and lower aligned openings 17 and 17a cut therefrom.

There is provided within the casing supporting means 19 for a price indicating tape 11 and gallon indicators 13. The tape 11 has printed on each side thereof a graduated scale of indicia designating the price per unit of liquid being dispensed, and is so supported that the same numerical indicia is simultaneously displayed through the upper openings 15 and 15a. The indicators 13 have indicia thereon for indicating the total number of units dispensed for each transaction and are so supported that they simultaneously display the same numerical indicia through the lower front and rear openings 17 and 17a of the casing.

Inasmuch as the supporting means are substantially duplicated to each side of the apparatus, the parts to the front of the casing will be designated by numerals and like parts to the rear of the casing will be designated by the same numeral with a suffix "a", the description referring to both parts only when essential for a clear understanding thereof.

More specifically, the supporting means 19 comprises a pair of spaced apart frame members 18 and 20 having laterally extending upper cross arms 22 carrying the supporting means for the tape 11, and laterally extending cross arms 24 carrying the supporting means for the indicators 13. The supporting means for the tape 11 include the brackets 34 and 34a, and, as best seen from Fig. 5, each bracket 34 is preferably formed of a single piece of elongated flat material bent into a substantially U shape to provide an end member 40 and spaced side members 38. The corners of the end member 40 are struck out and bent forwardly and parallel to the side members to provide spacer lugs 44, and the top and bottom edges of the end member intermediate of the spacer lugs are rounded off or curled rearwardly to form upper and lower guide rims 46 and 48 over which the indicating tape passes.

The bracket 34 is mounted in place on cross arms 22 by a bolt 42 extending through aligned openings 45 in the side members 38 of the bracket and aligned openings 47 in the upper cross arms 22, the bolt being secured by a suitable nut 43. The bracket is so mounted that the end member 40 is in alignment with casing opening 15 and spaced slightly inwardly from the casing wall 12 by the spacer lugs 44 to define a passage 50 through which the tape is drawn. The brackets each have mounted therein a rotatable shaft 52 extending transversely through alined openings 53 in the side members 38 and secured in place by suitable collars 56 pinned to the shaft and abutting against the outer faces of the side members. The shafts 52 also extend outwardly and through the side wall 10 of the casing and are provided on their outer ends with a knurled knob 58 for manually rotating the shaft.

There is pinned on each shaft 52, intermediate of the bracket side members 38 for simultaneous rotation therewith, a tape receiving reel or roll 60 having end flanges 62 and a centrally located slot 74 for receiving an anchoring tab 72 provided at the end of the tape. The reel 60 is centered on the supporting shaft by collars 66 positioned between the end flanges 62 thereof and the side members 38 of the tape bracket, and there is disposed between one collar 66 and one end flange a spring member 68 adapted to exert pressure against the flange and provide a frictional brake for the reel.

It will be noted that the shaft 52 is mounted in bracket 34 adjacent the upper edges thereof and is spaced inwardly from and in approximate alignment with the upper guide rim 46 of the end member 40, whereas the shaft 52a is positioned adjacent the lower edges of the bracket 34a and spaced inwardly and in approximate alignment with the lower guide rim 48a of the end member 40a. With this arrangement, one end of the tape 11 is secured to the reel 60 on the shaft 52 by inserting the anchoring tab 72 into the slot 74, and the tape is led therefrom over the upper edge 46 of end member 40 and down through the passage 50, whereupon the surface A of the tape will be visible through the opening 17.

The tape is then reversed in its travel around the lower rim edge 48 and led diagonally to the upper rim edge 46a of the end member 40a and then down through the passage 50a, whereupon the surface B of the tape will be visible through the opening 17a. The tape is then reversed in its travel around the lower rim edge 48a and led to the reel 60a into which the anchoring tab 72a is secured.

As the opposite sides A and B of the tape are thus simultaneously displayed through the openings 17 and 17a to the front and rear of the apparatus, the price per unit at the time the liquid is being dispensed may be simultaneously displayed by a proper arrangement of indicia on the tape. The arrangement of the indicia to accomplish this may best be seen from Figs. 6 and 7, wherein Fig. 6 diagrammatically shows the indicia on the surface A of the tape 11 and Fig. 7 diagrammatically shows the indicia on the surface B.

As it is desirable to have the indicia centered in the opening 17, and considering the numeral "12" to be the lowest price per unit to be displayed by the tape 11, the distance C from the anchoring tab of the tape to the center of the numeral "12" (Fig. 6) must be equal to the distance from the reel 60 to the center of the end member 40 as measured along the path of the tape. In order to simultaneously show the numeral "12" in the opposite opening 17a, the distance D from the center of the numeral "12" on the surface A to the center of the numeral "12" on the surface B (Fig. 7) must be equal to the distance from the center of the end member 40 to the center of the end member 40a as measured along the path of the tape. Due to the circuitous path of the tape, it will be seen that the numeral "12" on the surface B will lie approximately in line with the "$12\tfrac{7}{10}$" numeral on the surface A. With the lead off numerals established, the tape may then be subdivided into units equivalent to the depth of end wall members 17 and 17a, and with the indicia properly centered relative to said depths, they will be properly displayed in the openings upon adjustment of the tape. As the tape moves upwardly with respect to each opening, the graduations will also run in the same direction on each side of the tape.

With the tape so arranged, in order to adjust the tape to change the numerals to the next higher indicia, the shaft 52 will be rotated in a clockwise direction (see Fig. 2) to wind the tape thereon and cause it to move upwardly past the end member 40, whereupon the next succeeding higher numeral will be brought into view. Thus, if the tape is positioned as indicated in Figs. 2 and 3 with the numeral "$30\tfrac{1}{10}$" displayed in the openings 17 and 17a, then upon rotation of the knob 58 in a clockwise direction the numeral "30" on the surface A (Fig. 2) will move to the right to the next succeeding position, whereupon its position will be taken by the numeral "$30\tfrac{1}{10}$" and the numeral "$30\tfrac{2}{10}$" will be moved into the opening 17. Simultaneously, the numeral "30" on the surface B will move to the left in like manner.

If it is desired to have a lower figure displayed, the shaft 52a is rotated in a counterclockwise direction, whereupon the tape will be drawn in the opposite direction to move it downwardly past the opening, and the next lower numeral will be displayed in the openings. As it is also desirable that the purchaser know the price for the total number of units dispensed, there is also provided adjacent each numeral for the price per unit a scale indicating the total price of units dispensed from one to twenty. As it is desirable to have the price per unit read initially, it will be placed to the left of the center line of the tape on surface B, as seen in Fig. 8, and the graduated scale to the right. To obtain the same result, the reverse arrangement is made on surface A.

In order to maintain the tape under even tension at all times and to take up any slack which may develop therein, there is provided intermediate the ends of the diagonal lead thereof a floating weight 76 which is eccentrically mounted on supporting studs 78 supported by the side frames 18 and 20. With the weight so mounted, it is normally off center and exerts a downward pressure on the surface B of the tape, tending to maintain it taut at all times.

With the price per unit thus displayed in the upper openings, the indicators 13 are so positioned as to be simultaneously readable by the purchaser. To accomplish this, the lower cross arms 24 of the supporting means 19 are provided adjacent their outer ends with transversely extending shafts 28 on which the indicators are mounted. Each indicator comprises a plurality of numeral wheels 30 having indicia on their outer surfaces graduated from "0" to "9" and are centrally located relative to the openings so that one indicia of each wheel may be readily read through each opening. The counter wheels may be operated by any suitable counter mechanism driven from the fuel pump to indicate the total number of gallons dispensed for each transaction, and there may also be provided mechanism for resetting the counter wheels to "0" after each transaction; the counter and resetting mechanism being omitted as they are not necessary for an understanding of the invention herein.

Inasmuch as there is often a tax on liquid such as gasoline, there may further be provided additional openings 84 and 84a in the front and rear walls 12 and 12a arranged in alignment with the openings 17 and 17a. Positioned within the casing and also supported by the tape bracket 34 is a numeral wheel 80 provided on its outer surface with indicia for indicating the total tax to be added to each unit of liquid dispensed, and is rotatably mounted to permit the proper indicia to be displayed through the opening 84. The wheel is mounted on a stud shaft 81 secured to one side member 38 of the tape curtain bracket 34, and is positioned between a collar 82 secured to the stud 81 and a washer 83 abutting against the outer surface of the wheel and secured in place by a nut 84. There may also be provided a suitable friction spring 85 abutting against the inner surface of the wheel for maintaining it in set position.

With the above construction, it will be readily seen that the indicating tape 11 will be protected at all times and is readily adjustable for any change of price. Moreover, the openings for indicating the price per unit, the total gallons delivered for each transaction, and the amount of tax to be added are so positioned relative to one another that they may be easily and simultaneously read by the purchaser.

It will likewise be noted that the curtain supporting means including the brackets 34 and the winding reel 60 may be completely assembled, and the tax wheel 80 also mounted thereon, and the bracket then inserted and secured in place between the spaced apart arms 22, and, as the parts are substantially duplicated to both sides of the casing, the manufacturing of the device is greatly simplified.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

It is also to be understood that the language used in the following claim is intended to cover all of the generic and specific features of the invention herein described and all statements of the scope of the invention which, as a matter of language, might be said to fall therebetween.

I claim as my invention:

In a liquid dispensing apparatus, a casing having oppositely disposed openings in the front and rear walls thereof, supporting means within said casing adjacent each of said openings, a bracket carried by said supporting means at each opening, said brackets being provided with an end member and side members and so supported that the end member is spaced slightly inwardly from the opening, a reel transversely supported in one bracket adjacent the upper edges thereof, a second reel transversely supported by the other bracket adjacent the lower edges thereof, a tape extending between said reels, said tape being led from said first reel downwardly over the end member of its supporting bracket, then diagonally to the top of the end member of the other bracket, and then downwardly over the end member and to the reel supported by said bracket, whereby the reverse surfaces thereof are simultaneously displayed in the opposite openings, said tape having a graduated scale of indicia on the reverse surfaces thereof to indicate the price of liquid dispensed and so arranged that the same price is simultaneously indicated in each of said openings, and means for rotating said reels to adjust said tape.

JOHN H. CHAPLIN.